(12) United States Patent
Bryant et al.

(10) Patent No.: US 8,230,432 B2
(45) Date of Patent: Jul. 24, 2012

(54) DEFRAGMENTING BLOCKS IN A CLUSTERED OR DISTRIBUTED COMPUTING SYSTEM

(75) Inventors: Jay S. Bryant, Rochester, MN (US); Nicholas B. Goracke, Rochester, MN (US); Daniel P. Kolz, Rochester, MN (US); Dharmesh J. Patel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1398 days.

(21) Appl. No.: 11/753,173

(22) Filed: May 24, 2007

(65) Prior Publication Data

US 2008/0294872 A1 Nov. 27, 2008

(51) Int. Cl.
G06F 9/46 (2006.01)

(52) U.S. Cl. ....................................................... 718/104
(58) Field of Classification Search .................. None
See application file for complete search history.

(56) References Cited

U.S. PATENT DOCUMENTS

| 6,829,765 B1* | 12/2004 | Chan et al. .................... 718/104 |
| 2003/0188097 A1 | 10/2003 | Holland et al. |
| 2005/0071843 A1* | 3/2005 | Guo et al. .................... 718/101 |
| 2006/0080371 A1 | 4/2006 | Wong et al. |
| 2007/0174333 A1 | 7/2007 | Lee et al. |
| 2009/0271588 A1 | 10/2009 | Barsness et al. |
| 2009/0271807 A1 | 10/2009 | Barsness et al. |

OTHER PUBLICATIONS

Zhang, et al, "An Integrated Approach to Parallel Scheduling Using Gang-Scheduling, Backfilling, and Migration", IEEE Transactions on Parallel and Distributed Systems, vol. 14, No. 3, Mar. 2003.*

Krevat, Elie et al, "Job Scheduling for the BlueGene/L System", vol. 2537, Jul. 24, 2002, pp. 38-54.
Bhanot, Gyan et al, "The Blue Gene/L Supercomputer", Nuclear Physics B. Proceedings Supplement, North-Holland, Amsterdam, NL, vol. 119, May 1, 2003, pp. 114-121.
Aridor, Yariv et al, "Open Job Management Architecture for the Blue Gene/L Supercomputer", Job Scheduling Strategies for Parallel Processing, Dec. 9, 2005, pp. 91-107 URL: http://www.springerlink.com/content/pl5615w70888347m/>.
Yoo, Seong-Moo et al, "An Efficient Partial Compaction Scheme for Three-Dimensional Torus-Connected Parallel Systems", Proceedings of the International Conference on Parallel and Distributed Systems, IEEE Computer Society, Inc., Los Alamitos, CA, US, Jan. 1, 1999, pp. 225-230.
Chen, Ming-Syan et al, "Subcube Allocation and Task Migration in Hypercube Multiprocessors", IEEE Transactions on Computers, IEEE Service Center, Los Alamitos, CA, US, vol. 39, No. 9, Sep. 1, 1990, pp. 1146-1155.
Kang, Ohan et al, "A Graph-Based Subcube Allocation and Task Migration in Hypercube Systems", Frontiers of Massively Parallel Computation, 1992, Fourth Symposium on the McLean, VA, USA, Oct. 19-21, 1992, Los Alamitos, CA, USA, IEEE Computer Society, US, pp. 535-538.

(Continued)

*Primary Examiner* — Emerson Puente
*Assistant Examiner* — Gregory Kessler
(74) *Attorney, Agent, or Firm* — Patterson & Sheridan LLP

(57) ABSTRACT

Embodiments of the invention provides techniques for defragmenting blocks of resources allocated to perform computing jobs on a distributed or clustered system so that more contiguous physical resources may be made available to users submitting new job requests. Typically, the defragmentation process is performed when a job is submitted that requires access to a computing block that is larger than any currently available block in the parallel computing system.

22 Claims, 8 Drawing Sheets

OTHER PUBLICATIONS

Yoo, Seong-Moo et al, "On Task Relocation in Two-Dimensional Meshes", Journal of Parallel and Distributed Computing, Elsevier, Amsterdam, NL, vol. 60, No. 5, May 1, 2000, pp. 616-638.

McSherry, Michael A. et al, "Software Routing Support for Task Migration in Hypercube Multiprocessor Systems", Proceedings of the Annual International Computer Software and Applications Conference (COMPSAC), Orlando, Sep. 20-22, 1989, Washington, IEEE Comp., vol. CONF13, pp. 8-15.

Adiga, N.R. et al, "An Overview of the BlueGene/L Supercomputer", Supercomputing, ACM/IEEE 2002 Conference, Nov. 16, 2002, pp. 1-22 URL: http://ieeexplore.ieee.org/xpls/abs_all.jsp?arnumber=1592896.

Office Action History of U.S. Appl. No. 12/110,409 from Nov. 30, 2010 to Apr. 14, 2011.

Office Action of U.S. Appl. No. 12/110,412 dated Jun. 8, 2011.

* cited by examiner

TWO RACKS OF 1024 CLUSTERED NODES

= 32 FREE NODES

= 32 USED NODES

A DEFRAGMENTED CLUSTER BASED SUPER COMPUTER

TWO RACKS OF 1024 CLUSTERED NODES

☐ = 32 FREE NODES

▨ = 32 USED NODES

TWO RACKS OF 1024 CLUSTERED NODES

☐ = 32 FREE NODES  ▨ = 512 CONTIGUOUS NODES

▨ = 32 USED NODES

DEFRAGMENTING BLOCKS IN A CLUSTERED OR DISTRIBUTED COMPUTING SYSTEM

BACKGROUND OF THE INVENTION

1. Field of the Invention

The present invention generally relates to parallel computing. More specifically, the present invention relates to managing blocks of computing resources on a clustered or distributed computing system.

2. Description of the Related Art

Powerful computers may be designed as highly parallel systems where the processing activity of hundreds, if not thousands, of processors (CPUs) are coordinated to perform computing tasks. These systems are highly useful for a broad variety of applications including financial modeling, hydrodynamics, quantum chemistry, astronomy, weather modeling and prediction, geological modeling, prime number factoring, and image processing (e.g., CGI animations and rendering), to name but a few examples.

For example, one family of parallel computing systems has been (and continues to be) developed by International Business Machines (IBM) under the name BLUE GENE® system. The BLUE GENE®/L architecture provides a scalable, parallel computer that may be configured with a maximum of 65,536 (216) compute nodes. Each compute node includes a single application-specific integrated circuit (ASIC) with 2 CPUs and memory. The BLUE GENE®/L architecture has been successful and on Oct. 27, 2005, IBM announced that a BLUE GENE®/L system had reached an operational speed of 280.6 teraflops (280.6 trillion floating-point operations per second), making it the fastest computer in the world at that time. Further, as of June 2005, BLUE GENE®/L system installations at various sites world-wide were among five out of the ten top most powerful computers in the world.

IBM is currently developing a successor to the BLUE GENE®/L system, named BLUE GENE®/P system. BLUE GENE®/P system is expected to be the first computer system to operate at a sustained 1 petaflops (1 quadrillion floating-point operations per second). Like the BLUE GENE®/L system, the BLUE GENE®/P system is scalable allowing for configurations to include different number of racks.

In addition to the BLUE GENE® architecture developed by IBM, other highly parallel computer systems have been (and are being) developed. For example, a Beowulf cluster may be built from a collection of commodity off-the-shelf personal computers. In a Beowulf cluster, individual systems are connected using local area network technology (e.g., Ethernet) and system software is used to execute programs written for parallel processing on the cluster of individual systems. Another approach to parallel computing includes large distributed or grid-type computing systems which pool the computing power of hardware spread over a widely spread locations.

In these parallel systems, it is possible for one user to use only a subset of the total available hardware resources. Collectively, the resources assigned to carry out a particular computing job are usually referred to as a "block." In a BLUE GENE® system, for example, a "block" refers to a group of compute nodes assigned as a unit to perform a particular computing task. Given the number of nodes in most parallel systems, multiple jobs may be executed simultaneously on different blocks. Blocks can take on a wide variety of sizes and each block can have access to unique resources (e.g., a different amount of memory, different communications network, or access to different file system) based on the hardware and the location of the physical resources.

In some cases, the physical location of a block may have an effect on the system as a whole. That is, the fact that a given block is using a subset of hardware in a given physical location can, and often does, affect the usability of the remaining physical hardware at that location or the system as a whole. In some cases, this is due to the way that distributed and clustered computing systems are configured to communicate between the nodes.

More generally, a block using one set of resources may have an effect on the system, and other users, as a whole. For example, computing blocks may be allocated in a way that the resources being used prevent enough physical resources from being available to meet the demands of other users on the system. That is, the compute nodes of the parallel system can become fragmented by multiple jobs running at different locations on the system. For example, a distributed or clustered computing system may become fragmented when a number of small jobs are assigned to blocks in a manner that prevents a large contiguous block of resources from being utilized. Depending on how the blocks are assigned, and how long computing jobs need to execute, sometimes a job that requires a large block of compute nodes may have to wait to be assigned a block, even though the system as a whole may have the needed number of compute nodes available. Further, if new smaller jobs continue to be submitted for execution, then the larger job may starve while the smaller jobs are executed, further fragmenting the resources of the parallel system.

Accordingly, there remains a need for techniques for defragmenting blocks in a clustered or distributed computing system.

SUMMARY OF THE INVENTION

One embodiment of the invention provides a method for allocating computing resources on a parallel computing system having a plurality of compute nodes, each compute node having at least one processor. The method generally includes suspending one or more of a plurality of computing jobs being executed on the parallel computing system. Each computing job is being executed on a block of compute nodes provided by the parallel computing system. The method further includes moving each of the one or more suspended computing jobs to another block of compute nodes of the parallel system, whereby a space of available compute nodes provided by the parallel computing system is defragmented, and resuming execution of the one or more suspended jobs on the parallel computing system.

Another embodiment of the invention provides a computer-readable storage medium containing a program which, when executed, performs an operation method for allocating computing resources on a parallel computing system having a plurality of compute nodes, each compute node having at least one processor. The operation generally includes suspending one or more of a plurality of computing jobs being executed on the parallel computing system. Each computing job is being executed on a block of compute nodes provided by the parallel computing system. The operation also includes moving each of the one or more suspended computing jobs to another block of compute nodes of the parallel system, whereby a space of available compute nodes provided by the parallel computing system is defragmented, and resuming execution of the one or more suspended jobs on the parallel computing system.

Still another embodiment of the invention includes a parallel computing system having a plurality of compute nodes, each having at least a processor and a memory and a control sub-system configured to allocate computing resources on a parallel computing system. The control sub-system may be configured to perform the steps of suspending one or more of a plurality of computing jobs being executed on the parallel computing system. Each computing job is being executed on a block of compute nodes provided by the parallel computing system. The control sub-system may be further configured to move each of the one or more suspended computing jobs to another block of compute nodes of the parallel system, whereby a space of available compute nodes provided by the parallel computing system is defragmented, and to resume execution of the one or more suspended jobs on the parallel computing system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
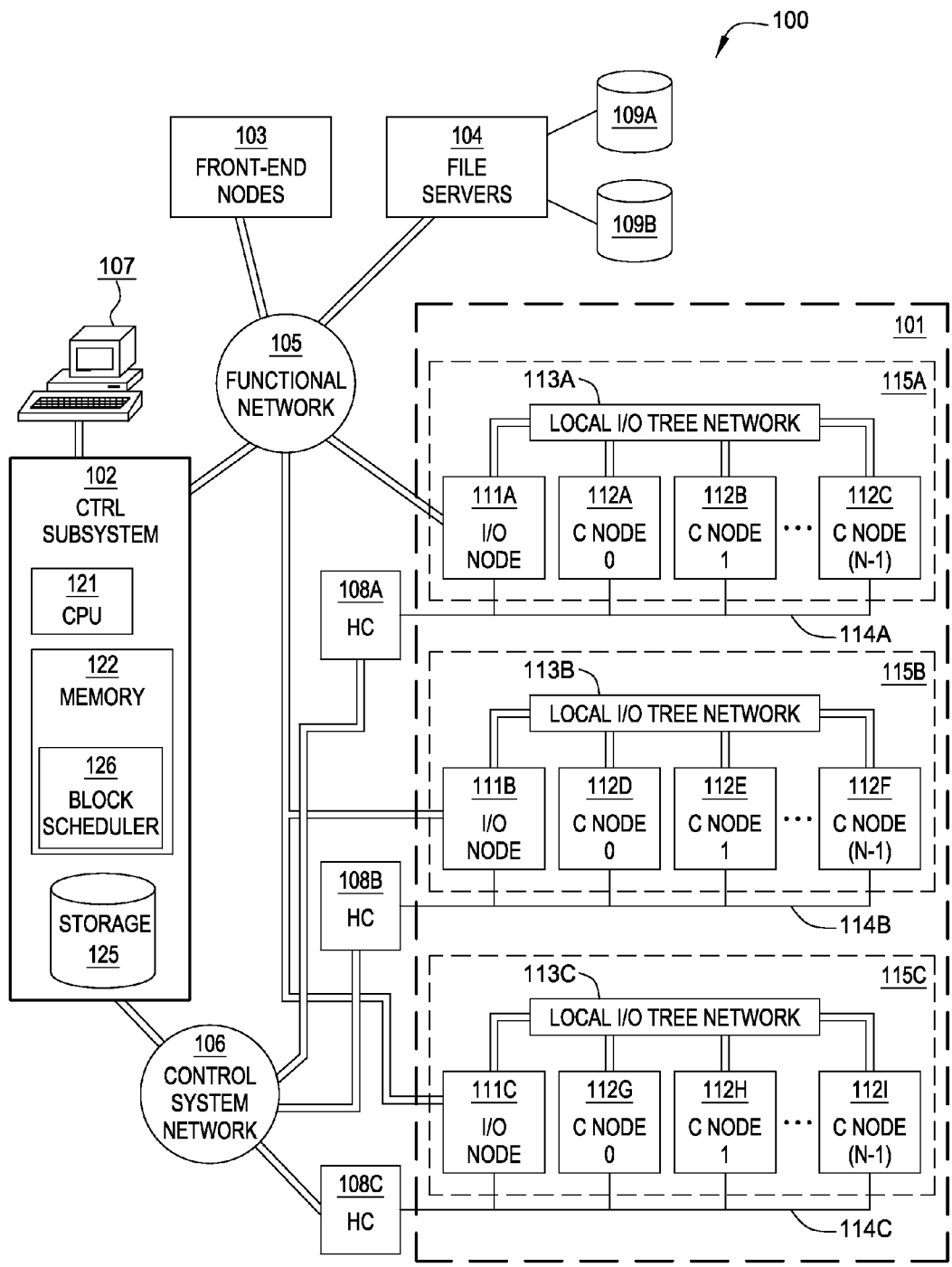
FIG. 1 is a high-level block diagram of components of a parallel computer system, according to one embodiment of the present invention.

Embodiments of the invention provide a method to defragment blocks of resources allocated to perform computing jobs on a distributed or clustered system so that more contiguous physical resources may be made available to users submitting new job requests. Typically, the defragmentation process is performed when a job is submitted that requires access to a computing block that is larger than any currently available block in the parallel computing system.

In the following, reference is made to embodiments of the invention. However, it should be understood that the invention is not limited to specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a high-level block diagram of components of a massively parallel computer system 100, according to one embodiment of the present invention. Illustratively, computer system 100 shows the high-level architecture of an IBM BLUE GENE® computer system, it being understood that other parallel computer systems could be used, and the description of a preferred embodiment herein is not intended to limit the present invention.

FIG. 1 is a high-level block diagram of components of a massively parallel computer system 100, according to one embodiment of the present invention. Illustratively, computer system 100 shows the high-level architecture of an IBM BLUE GENE® computer system, it being understood that other parallel computer systems could be used, and the description of a preferred embodiment herein is not intended to limit the present invention.

As shown, computer system 100 includes a compute core 101 having a number of compute nodes arranged in a regular array or matrix, which perform the useful work performed by system 100. The operation of computer system 100, including compute core 101, may be controlled by control subsystem 102. Various additional processors in front-end nodes 103 may perform auxiliary data processing functions, and file servers 104 provide an interface to data storage devices such as disk based storage 109A, 109B or other I/O (not shown). Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. Each I/O node 111 may include a processor and interface hardware that handles I/O operations for a set of N compute nodes 112; the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O tree network 113A-C. The I/O nodes, in turn, are connected to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 is a computer that includes a processor (or processors) 121, internal memory 122, local storage 125, and block scheduler 126. An attached console 107 may be used by a system administrator or similar person. Control subsystem 102 may also include an internal database which maintains state information for the compute nodes in core 101, and an application which may be configured to, among other things, control the allocation of hardware in compute core 101, direct the loading of data on compute nodes 112, and perform diagnostic and maintenance functions. Block scheduler 126 may be configured to assign compute nodes 112 of compute core 101 to a block used to carry out a given user request or job. The database on local storage 125 may be used to record which computing resources (e.g., compute nodes 112) of the parallel system are allocated to a given block and which computing resources are available to perform computing tasks.

In one embodiment, a request to perform a computing task may also specify a block size to use in carrying out the task. That is, the user may request the size of a block on which a submitted job should be executed. Further, in some cases the user may request specific compute nodes 112 of parallel system 100. This may be useful where different compute nodes have access to different resources. For example, in a distributed or grid-type system, computing resources available to one block of compute nodes may be dissimilar to others. Thus, if a job requires access to resources that are available at a particular location of a grid, then the job may request access to that location. Similarly, where multiple users may rent (or otherwise share) computing time on a parallel system (e.g., system 100), the size of a block may depend on which (or how many) compute nodes 112 a given user is authorized to access. Alternatively, a job may specify that a job should be run on a block of a particular size, without regard to any particular location on the parallel system. This may be useful when running jobs on a large cluster or parallel system such as a BLUE GENE® system, where the compute nodes are relatively homogenous.

Control subsystem 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate.

In addition to control subsystem 102, front-end nodes 103 provide computer systems used to perform auxiliary functions which, for efficiency or otherwise, are best performed outside compute core 101. Functions which involve substantial I/O operations are generally performed in the front-end nodes. For example, interactive data input, application code editing, or other user interface functions are generally handled by front-end nodes 103, as is application code compilation. Front-end nodes 103 are connected to functional network 105 and may communicate with file servers 104.

Figure 2:
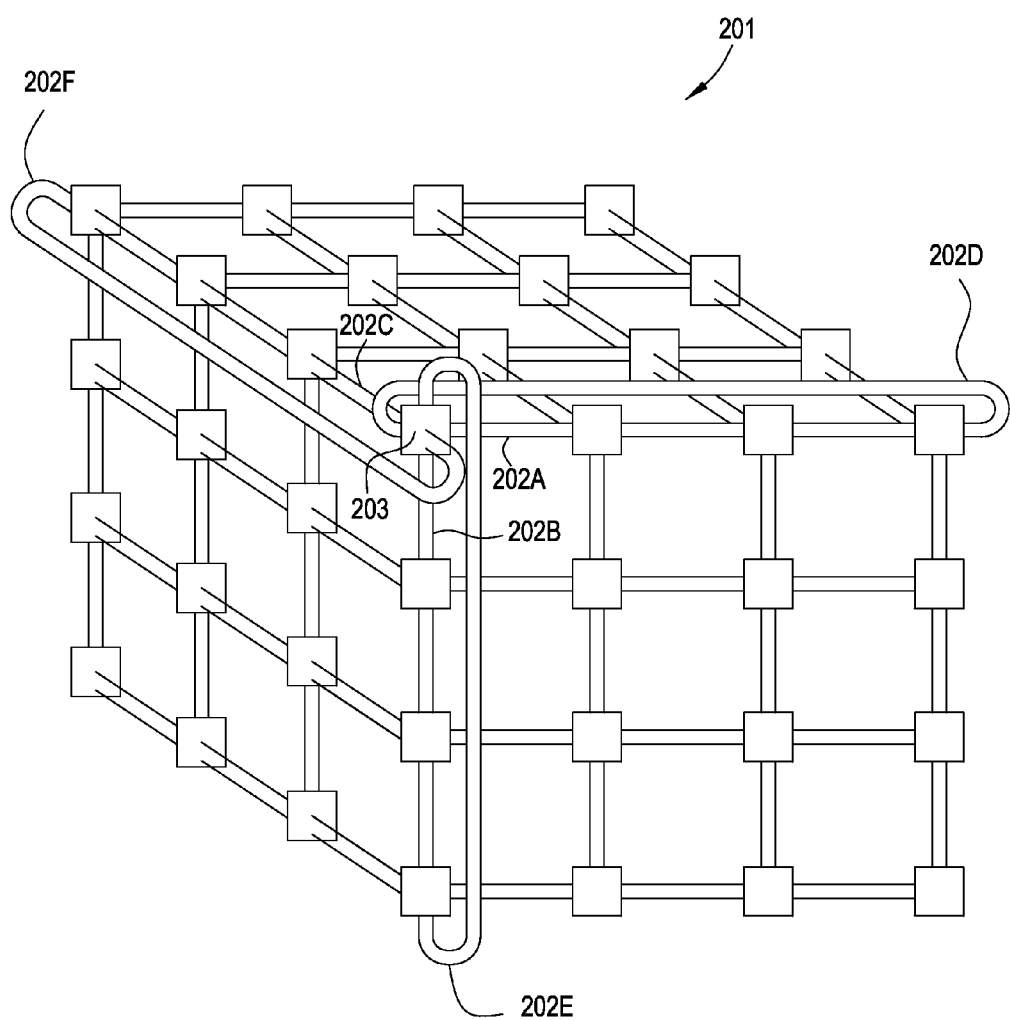
FIG. 2 is a conceptual illustration of a three-dimensional torus network of the system of FIG. 1, according to one embodiment of the invention.

In one embodiment, compute nodes 112 are arranged logically in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 contiguous nodes, it will be understood that the actual number of compute nodes in a parallel computing system is typically much larger. For example, a complete BLUE GENE®/L system includes 65,536 compute nodes. Each compute node 112 in torus 201 includes a set of six node-to-node communication links 202A-F which allows each compute nodes in torus 201 to communicate with its six immediate neighbors, two nodes in each of the x, y and z coordinate dimensions. Torus 201 is also representative of a block formed from 64 contiguous compute nodes. That is, torus 201 may be a subset of compute nodes from compute core 101 used to form a block and to execute a particular computing task.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around.

For example, this is represented in FIG. 2 by links 202D, 202E, and 202F which wrap around from a last node in the x, y and z dimensions to a first node. Thus, although node 203 appears to be at a "corner" of the torus, node-to-node links 202A-F link node 203 to nodes 202D, 202E, and 202F, in the x, y, and z dimensions of torus 201.

Figure 3:
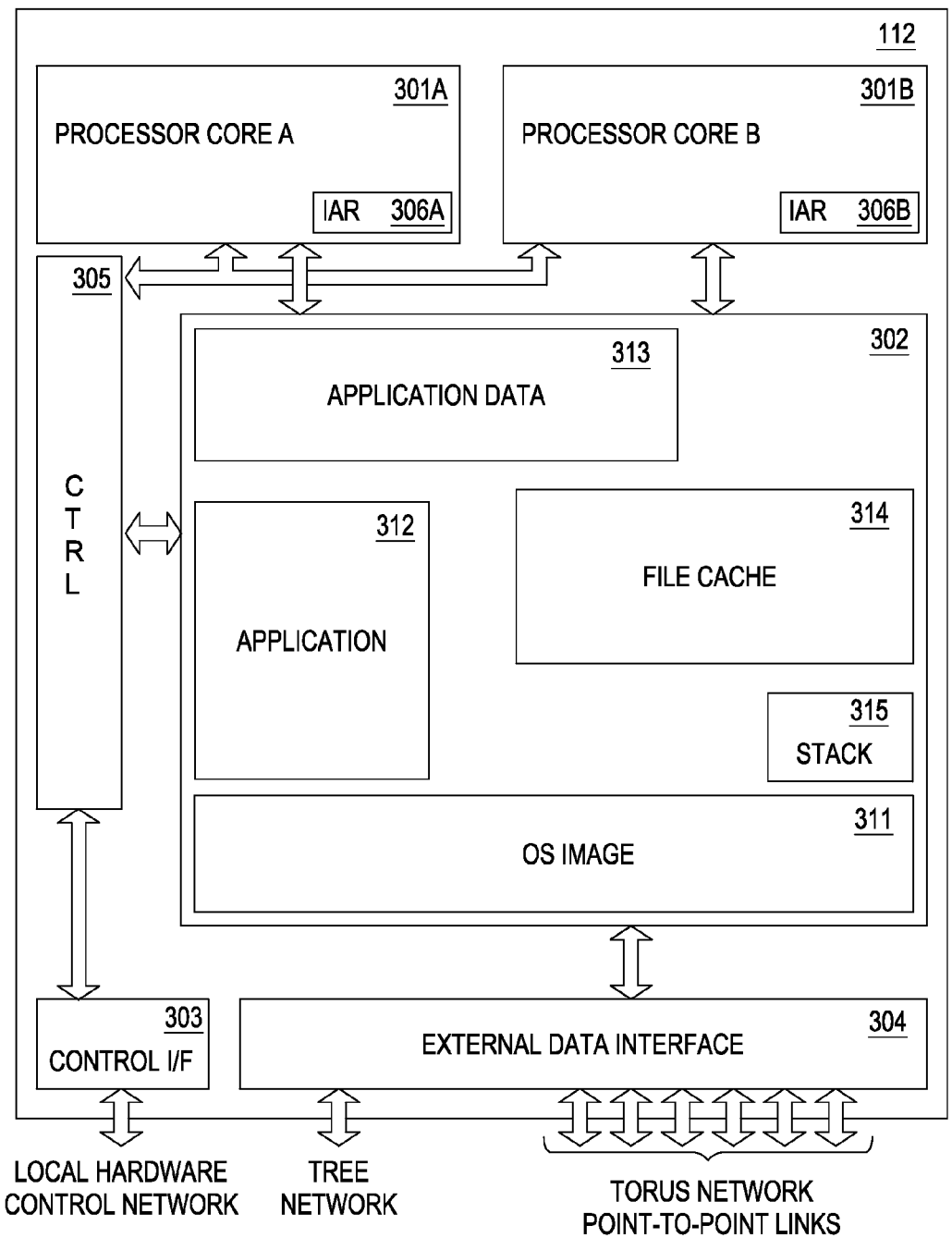
FIG. 3 is a high-level diagram of a compute node of the system of FIG. 1, according to one embodiment of the invention.

FIG. 3 is a high-level diagram of a compute node 112 of the system 100 of FIG. 1, according to one embodiment of the invention. As shown, compute node 112 includes processor cores 301A and 301B, and also includes memory 302 used by both processor cores 301; an external control interface 303 which is coupled to local hardware control network 114; an external data communications interface 304 which is coupled to the corresponding local I/O tree network 113, and the corresponding six node-to-node links 202 of the torus network 201; and monitoring and control logic 305 which receives and responds to control commands received through external control interface 303. Monitoring and control logic 305 may access processor cores 301 and locations in memory 302 on behalf of control subsystem 102 to read (or in some cases alter) the operational state of node 112. In one embodiment, each node 112 may be physically implemented as a single, discrete integrated circuit chip.

As described, functional network 105 may service many I/O nodes, and each I/O node is shared by multiple compute nodes 112. Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311, an application code image 312, and user application data structures 313 as required. Some portion of memory 302 may be allocated as a file cache 314, i.e., a cache of data read from or to be written to an I/O file. Operating system image 311 provides a copy of a simplified-function operating system running on compute node 112. Operating system image 311 may includes a minimal set of functions required to support operation of the compute node 112. In a BLUE GENE® system, for example, operating system image 311 contains a version of the LINUX® operating system customized to run on compute node 112. Of course, other operating systems may be used, and further it is not necessary that all nodes employ the same operating system. (Also note, LINUX® is a registered trademark of Linus Torvalds in the United States and other countries.)

Application code image 312 represents a copy of the application code being executed by compute node 112. Application code image 312 may include a copy of a computer program and data submitted for execution on system 100. In one embodiment, a group of compute nodes may be assigned to a block, where each node in the block executes the same application code image 312. The application image on each node may be configured to communicate with the other nodes of that block in performing the computing job. For example, many computing tasks may be performed in parallel, and each node of the block participates in performing a collective task. Using parallel processing techniques to run on a block of hundreds, thousands, or even tens of thousands of compute nodes allows otherwise intractable computing tasks to be performed. Memory 302 may also include a call-return stack 315 for storing the states of procedures which must be returned to, which is shown separate from application code image 302, although it may be considered part of application code state data.

As part of executing a job, application 312 may be configured to transmit messages from compute node 112 to other compute nodes assigned to a given block. For example, the high level MPI call of MPI_Send( ) may be used by application 312 to transmit a message from one compute node to another. On the other side of the communication, the receiving node may call use the MPI call MPI_Recieve( ) to receive and process the message. As described above, in a BLUE GENE® system, the external data interface 304 may be configured to transmit the high level MPI message by encapsulating it within a set of packets and transmitting the packets of over the torus network of point-to-point links. Other parallel systems also include a mechanism for transmitting messages between different compute nodes. For example, nodes in a Beowulf cluster may communicate using a high-speed Ethernet style network. Similarly, large distributed or grid-type systems use message passing techniques to coordinate the processing activity of a block of compute nodes.

Figure 4:
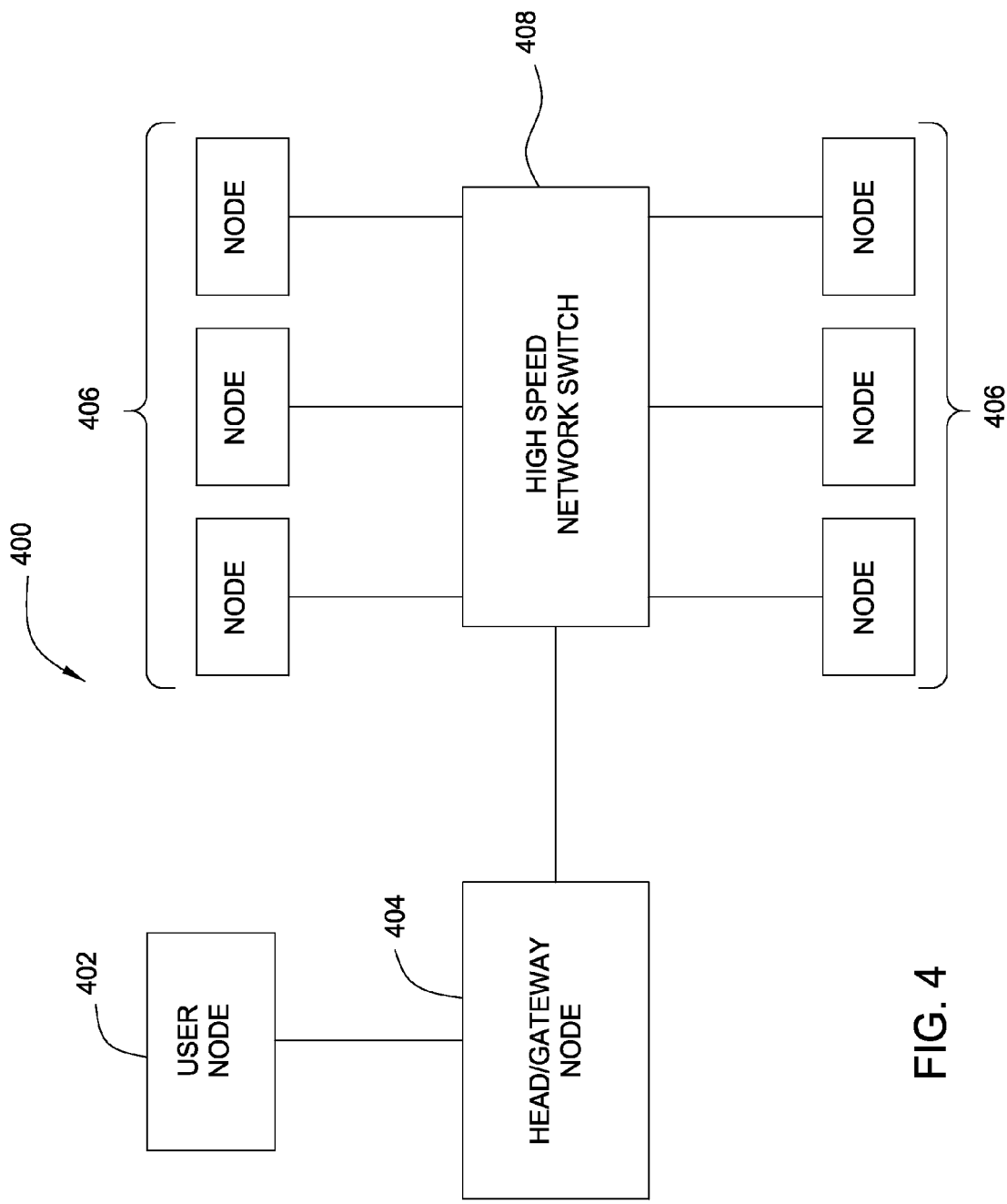
FIG. 4 is a conceptual illustration of a computing cluster, according to one embodiment of the invention.

FIG. 4 illustrates the high level architecture of a Beowulf cluster, according to one embodiment of the invention. It being understood that other parallel computer systems could be used, and the description of this architecture is not intended to limit the present invention.

Cluster 400 is representative of a Beowulf cluster, as well as other clustering architectures. As shown, cluster 400 includes a user node 402, gateway node 404, and compute nodes 406 connected via high-speed network switch 408. Those skilled in the art will recognize that FIG. 4 provides a simplified representation of a computing cluster, and that the nodes of a typical computing cluster include a number of additional elements.

User node 402 may provide an interface to cluster 400. As such, user node 402 allows users to create, submit, and review the results of computing tasks submitted for execution to cluster 400. As shown, user node 402 is connected to head/gateway node 404. Head/gateway node 404 connects the user node 402 to the compute nodes 406. Compute nodes 406 provide the processing power of cluster 400. As is known, clusters are often built from racks of commonly available PC components. Thus, each node 406 may include one or more CPUs, memory, hard disk storage, a connection to high speed network switch 408, and other common PC components. Like the compute nodes 112 of parallel system 100, a compute node 406 of cluster 400 may be subdivided into blocks, where different computing jobs are assigned to different blocks for execution.

As described above, as jobs are submitted for execution on the compute nodes of a parallel computer system, the free nodes may become fragmented. For example, on the BLUE GENE®/L system, jobs are executed on a blocks of compute nodes, and the blocks themselves may be allocated in groups of 32, 128, 512 or multiples of 1024 nodes. Over time, as jobs finish executing, and as new jobs are submitted, the selection of available compute nodes may become fragmented. In one embodiment, as jobs are submitted, a block scheduler may determine whether a collection of contiguous compute nodes are available to form a block to run a given job. If such a collection is unavailable, then the block scheduler may be configured to defragment or compact the running jobs to create a larger contiguous free space of compute nodes. This defragmentation process may include suspending the jobs running on different blocks and transferring the jobs to new blocks.

Figure 5A:
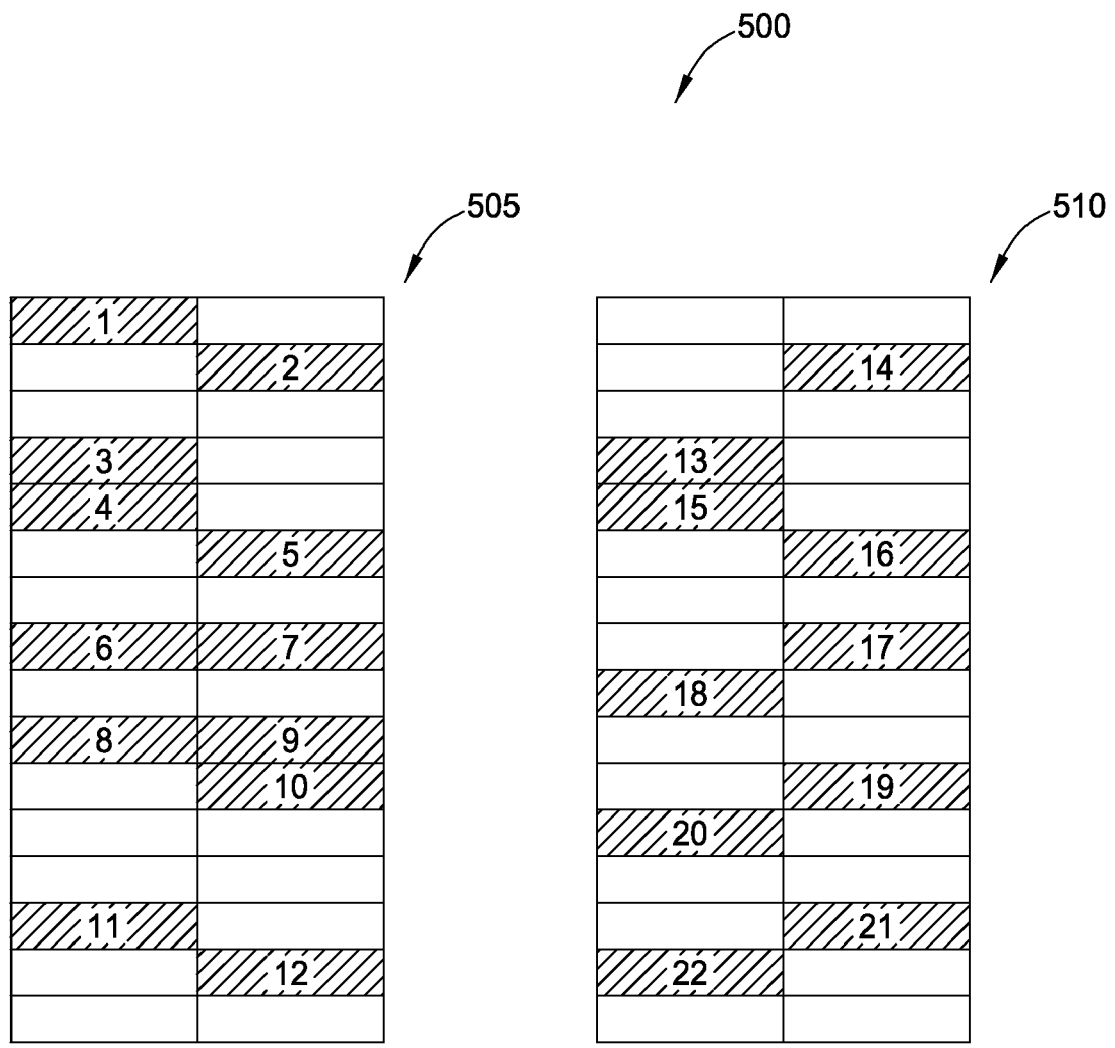
FIGS. 5A-5C are a conceptual illustration of blocks of compute nodes in a parallel computer system, according to one embodiment of the invention.
Figure 5A:
Figure 5A:
Figure 5B:
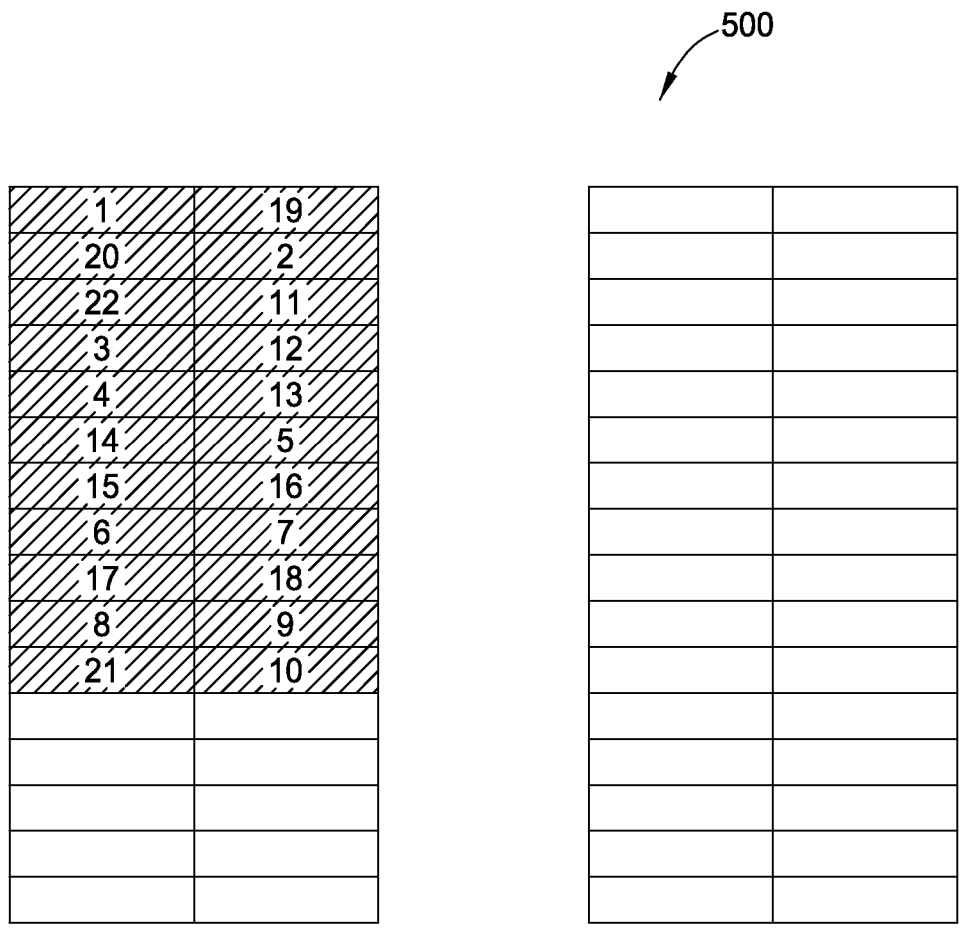
Figure 5C:
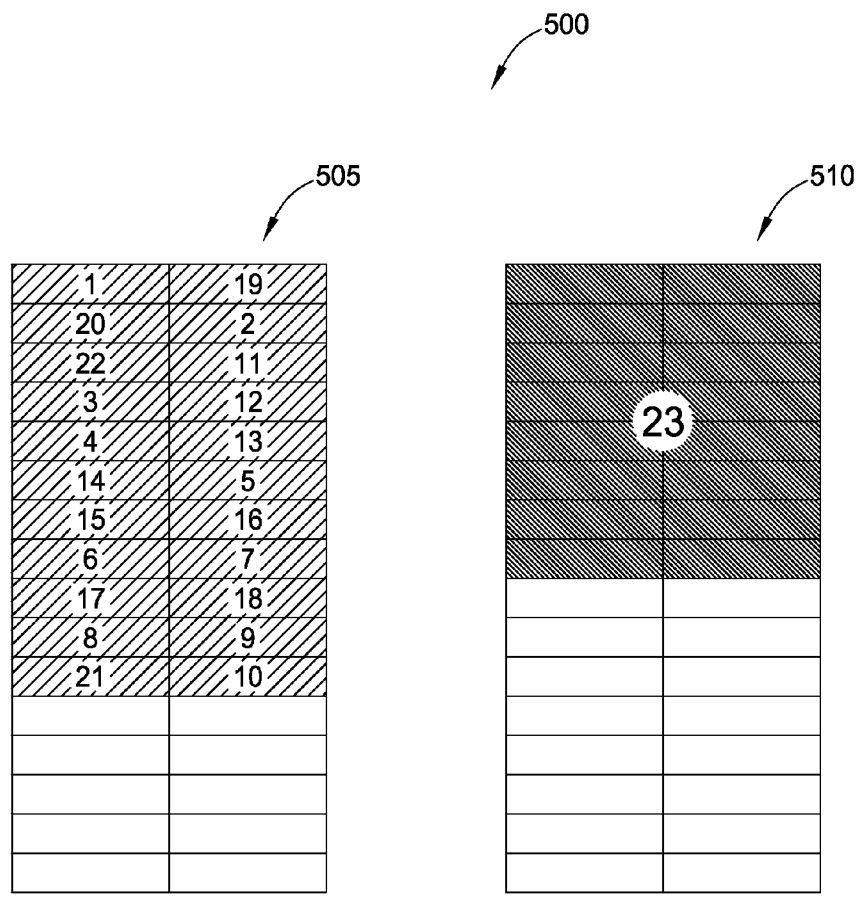

FIGS. 5A-5C provide a conceptual illustration of a parallel computing system 500 performing perform multiple computing tasks, according to one embodiment of the invention. As shown in FIG. 5A, parallel computing system 500 includes a compute core built from racks 505 and 510, where each rack houses 1024 compute nodes. The nodes are subdivided into blocks of 32 nodes. Thus, each of racks 505 and 510 include 32 blocks. Assume that each of the 32 blocks of compute nodes may be allocated to run a different computing job. Illustratively, twenty-two computing jobs are being executed on one of the compute-node blocks of parallel system 500. Of course, the example of 32 nodes is used for simplicity and embodiments of the invention may be used to defragment blocks of compute nodes of any size.

Also, in this example, the jobs running on system 500 are evenly distributed, more or less, across the blocks of racks 505 and 510. Because of this relatively even distribution, the jobs running on system 500 are organized in a manner such that there is no contiguous block of resources available greater than 96 nodes. Thus, any job request for a block of nodes greater than this size will have to wait for some of the twenty-two jobs currently running to complete execution, before it may even begin to run. For example, a contiguous block of 128 nodes may become available when any of the jobs on blocks 2, 5, 8, 10, 11, 12, 13, 14, 15, 16, 18, 19, 20, 21 or 22 complete running, provided no new 32-node jobs are initiated. Thus, a 128 node block could be come available relatively quickly. However, a block of 512 or 1024 compute nodes would require a large number of compute jobs running on system 500 to complete, without any new jobs being initiated on system 500.

Further, this situation may be compounded by other constraints of the system. For example, the BLUE GENE®/L architecture supports blocks of 32, 128, 512 or multiples of 1024 compute nodes. As a result, given the current distribution of compute jobs, system 500 could only support user requests for 32 node blocks even though the system has 1344, or 65.6%, of its nodes are available, and has five separate groups of three contiguous blocks (96 compute nodes). This example illustrates how a system with many users running computing tasks on a block of 32 or 128 compute nodes can easily fragment the overall system, leaving it in a state where much of the system is unusable for users who wish to run jobs that utilize larger blocks of compute nodes.

If new jobs are being submitted for execution on system 500, then it may remain fragmented. In one embodiment, computing jobs may continue to be submitted until the fragmentation created by block allocation prevents a new job from being executed (e.g., a request to run a job on a contiguous block of 512 compute nodes on system 500). When this occurs, the system 500 may be configured to defragment, or compact, the blocks of compute nodes allocated to run computing jobs. In one embodiment, system 500 may be defragmented by suspending some (or all) of the currently running jobs and moving them to different blocks. By moving the currently running jobs, the fragmentation present in system 500 may be reduced, allowing compute jobs that need larger blocks to be executed. Although some additional overhead is incurred in suspending and moving jobs from one block to another, it is frequently more than offset by overall increase in system utilization.

In one embodiment, the defragmentation of system 500 may be coordinated and managed by control subsystem 102 of FIG. 1. For example, control system 102 may be configured to analyze data regarding the allocation of blocks of compute nodes in relation to free compute nodes. Additionally, the data may be supplemented to include the memory size required (if any), the file system and the sub-network required for communication (if any) for a given job to run. Thus, as jobs are moved around computing blocks of the parallel system, any constraints of a particular job may be respected in the defragmentation process.

As stated, a request to perform a computing job may also specify which specific block to use in carrying out the job. Alternatively, a user may specify the number of compute nodes on which a job needs to run and allow the control subsystem 102 to find and create the necessary block. If the user requests a specific block and that block is free, then the requested block is allocated and the user's job is executed. In one embodiment, if the user is allocated a particular block, then the user's job runs on that hardware. However, control subsystem 102 may subsequently move that job to a different block of hardware (of the same size) if it is determined that the system needs to be defragmented.

Currently, if the requested block (or portion thereof) is in use, or if there is not a block of the size needed for the users' job, then the user's request may be rejected, and the user is informed the requested hardware is unavailable. For example, if a user submits a job to be executed on 512 compute nodes (i.e., on 16 blocks) on the system 500, then this job would either be queued waiting for hardware to free up, or the job would simply fail reporting a lack of system resources.

In the case that the user needs 512 nodes where there are only 32 contiguous nodes available, the system would search to see if there was a total of 512 nodes free. If 512 free nodes are found, then the control sub-system 102 may be configured to determine whether the existing jobs may be moved in a way that a block of 512 nodes could be made available. That is, the control sub-system 102 may determine whether the system may be defragmented. In one embodiment, the control subsystem 102 may determine whether currently running jobs may be transferred to other blocks of the system. If so, then the control subsystem may suspend some (or all) of the active jobs, transfer the suspended jobs to new blocks, and then allow the suspended jobs to resume execution on the new blocks. The control subsystem may also re-associate the console, output, files and any other resources with the jobs which were moved resulting in a seamless experience for the user. Once defragmented, the new control sub-system 102 is now able to create a block for a job requiring a block of 512 compute nodes from the free space created by moving smaller job(s).

In one embodiment, an administrator may configure control sub-system 102 to specify how aggressive it should be in defragmenting the system 500. For example, an administrator could choose to have all blocks consolidated, to maximize free space whenever a defragmentation is triggered. Alternatively, an administrator could also configure system 500 to be less aggressive, to maximize the speed with which a user's requests were fulfilled. In such a case, the defragmentation process may minimize the number of jobs suspended and moved in order to free up enough space for a new job request.

FIG. 5B illustrates parallel system 500 after a full defragmentation process has been performed, and the twenty-two jobs running on system 500 have been compacted to leave no small free blocks between any running jobs. Specifically, the active jobs on system 500 are compacted to the blocks on rack 505. In this example, jobs 1 through 10 remain on the same blocks they occupied before the system 500 is defragmented. Blocks 11 through 22 were moved over to fill in the available spaces of rack 505. As a result of the defragmentation, rack 505 includes a free space that could support two jobs that required 128 nodes, and rack 510 is completely free. The 1024 compute nodes of rack 510 could be allocated as a single block or could be split into two, 512 node blocks. FIG. 5C illustrates this result where a job that requested 512 compute nodes is now running on rack 510 (shown as job 23). In this example, the defragmentation process reduces the percentage of free nodes from 65.6% to 40.6%, thus this example illustrates how the defragmentation process may lead to a substantial increase in overall system utilization.

Figure 6:
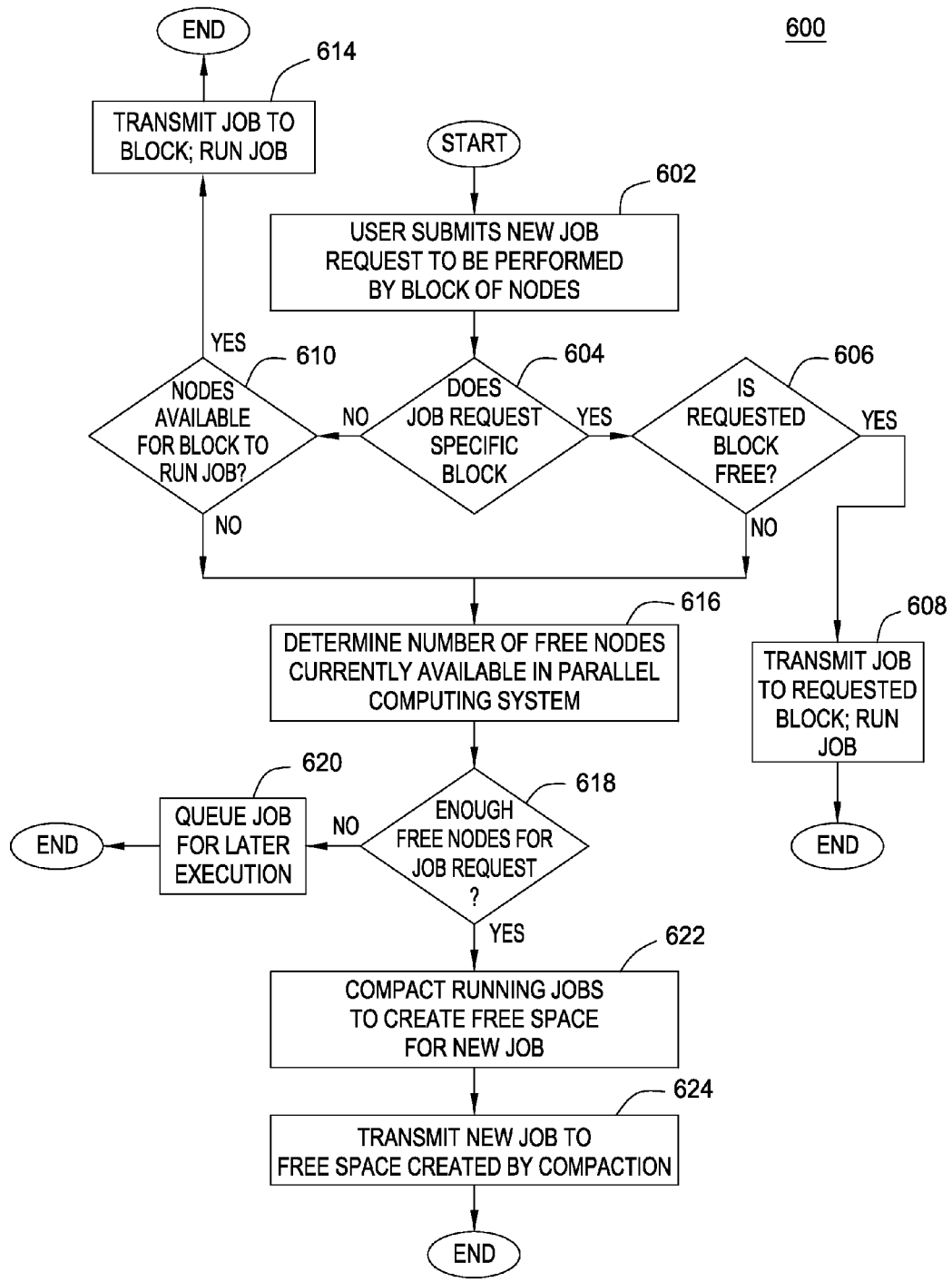
FIG. 6 is a flow diagram illustrating a method for managing blocks of computing resources on a clustered or distributed computing system, according to one embodiment of the invention.

FIG. 6 is a flow diagram illustrating a method 600 for managing blocks of computing resources on a parallel computing system, according to one embodiment of the invention. As shown, the method begins at step 602 where a user submits a new job request to be executed on the parallel computing system. As stated, the request may also specify a specific set of computing resources for the job. Accordingly, at step 604 the system determines whether the job request indicates that a specific set of recourses should be used to perform the computing job (e.g., a particular block of compute nodes). If so, at step 606, the system may determine whether the requested block is available. If the requested block is available, then at step 608, the job is transmitted to the requested block where it begins executing.

Alternatively, if the job request submitted at step 602 does not specify a particular set of resources but only a particular block size (e.g., 32, 128, 512 or 1024 compute nodes), then at step 610, the system determines whether there is a set of compute nodes available to form a block of the needed size and run the job. If so, at step 614, the block is created and the job is transmitted to that block where it begins executing. However, if a requested block is unavailable, or there is not a single block large enough to execute the job submitted at step 602, then the parallel system may initiate a defragmentation process to free up the computing resources necessary to run the job.

At step 610, the control sub-system may determine the number of free nodes currently available in the parallel computing system. Using the example of FIG. 5A, the system would determine that 42 free blocks (accounting for 1344 compute nodes) are available, although heavily fragmented across racks 505 and 510. At step 618, the system determines whether enough free nodes are available for the job request submitted at step 602. If not, then at step 620, the job submitted at step 602 may be queued for later execution. For example, if a system is highly utilized, then the unavailability of a large block of compute nodes may not be the result of system fragmentation. In such a case, if performing the defragmentation process would not result in an available block of free nodes to run the job submitted at step 602, then there may not be sufficient reason to incur the overhead of performing it.

At step 622, the parallel computing system may be defragmented to create free space for the job submitted at step 602. For example, FIG. 5B illustrates a complete defragmentation of the jobs running on blocks of system 500. As described, the compute nodes of a parallel computing system may be defragmented by a control sub-system configured to suspend a job running on a given block, move the job to a new block, and resume the execution of the job on the new block.

At step 624, once the defragmentation process is finished, a block is created to run the job submitted at step 602. That job may then be transmitted to the block where it begins executing. Thus, advantageously, embodiments of the invention may be used to free up valuable computing resources that, otherwise, would go unused. Accordingly, embodiments of the invention may greatly improve the overall functionality and efficiency of distributed and cluster based parallel computing systems While the foregoing is directed to embodiments of the present invention, other and further embodiments of the invention may be devised without departing from the basic scope thereof, and the scope thereof is determined by the claims that follow.

What is claimed is:

1. A method for allocating computing resources on a parallel computing system having a plurality of compute nodes, each compute node having at least one processor, a plurality of computing jobs being executed on the parallel computing system, wherein each computing job is being executed on a block of compute nodes provided by the parallel computing system, the method comprising:
   receiving a new computing job to be executed on the parallel computing system; and
   before attempting to move one of the computing jobs responsive to receiving the new computing job:
      upon determining that the parallel system is fragmented to the extent that a block of compute nodes cannot be allocated to the new computing job and that there are enough free compute nodes for the new computing job:
         suspending one or more of the plurality of computing jobs being executed on the parallel computing system,
         moving each of the one or more suspended computing jobs to another block of compute nodes of the parallel system, whereby a space of available compute nodes provided by the parallel computing system is defragmented, and
         resuming execution of the one or more suspended jobs on the parallel computing system.

2. The method of claim 1, wherein the new computing job includes a request for a specific number of compute nodes of the parallel system on which to execute the new computing job.

3. The method of claim 1, wherein the new computing job includes a request that the new computing job be executed on a specific block of compute nodes provided by the parallel computing system.

4. The method of claim 1, wherein the one or more computing jobs are selected to minimize the quantity of computing jobs suspended and moved in order to create a space of compute nodes to allocate to the new computing job.

5. The method of claim 1, wherein the one or more computing jobs are suspended and moved to maximize the defragmentation of the parallel system.

6. The method of claim 1, wherein at least one of the plurality of computing jobs requires access to a resource provided by the block on which that computing job is being executed, and wherein the at least one computing job is not one of the one or more suspended and moved computing jobs.

7. The method of claim 6, wherein the resource is selected from at least a memory resource, network communication link, and a file system resource.

8. The method of claim 1, wherein the compute nodes of the parallel system are connected by a plurality of point-to-point links.

9. The method of claim 8, wherein the point-to-point links form a torus.

10. The method of claim 1, wherein the parallel computing system is a clustered computing system.

11. A computer-readable storage medium containing a program which, when executed, performs an operation method for allocating computing resources on a parallel computing system having a plurality of compute nodes, each compute node having at least one processor, a plurality of computing jobs being executed on the parallel computing system, wherein each computing job is being executed on a block of compute nodes provided by the parallel computing system, the operation comprising:
   receiving a new computing job to be executed on the parallel computing system; and
   before attempting to move one of the computing jobs responsive to receiving the new computing job:
      upon determining that the parallel system is fragmented to the extent that a block of compute nodes cannot be allocated to the new computing job and that there are enough free compute nodes for the new computing job:
         suspending one or more of the plurality of computing jobs being executed on the parallel computing system,
         moving each of the one or more suspended computing jobs to another block of compute nodes of the parallel system, whereby a space of available compute nodes provided by the parallel computing system is defragmented, and
         resuming execution of the one or more suspended jobs on the parallel computing system.

12. The computer-readable storage medium of claim 11, wherein the new computing job includes a request for a specific number of compute nodes of the parallel system on which to execute the new computing job.

13. The computer-readable storage medium of claim 11, wherein the new computing job includes a request that the new computing job be executed on a specific block of compute nodes provided by the parallel computing system.

14. The computer-readable storage medium of claim 11, wherein the one or more computing jobs are selected to minimize the quantity of computing jobs suspended and moved in order to create a space of compute nodes to allocate to the new computing job.

15. The computer-readable storage medium of claim 11, wherein the one or more computing jobs are suspended and moved to maximize the defragmentation of the parallel system.

16. The computer-readable storage medium of claim 11, wherein at least one of the plurality of computing jobs requires access to a resource provided by the block on which that computing job is being executed, and wherein the at least one computing job is not one of the one or more suspended and moved computing jobs.

17. A parallel computing system, comprising:
   a plurality of compute nodes, each having at least a processor and a memory, a plurality of computing jobs being executed on the parallel computing system, wherein each computing job is being executed on a block of compute nodes provided by the parallel computing system; and
   a control sub-system configured to allocate computing resources on a parallel computing system by performing the steps of:
receiving a new computing job to be executed on the parallel computing system, and
   before attempting to move one of the computing jobs responsive to receiving the new computing job:
      upon determining that the parallel system is fragmented to the extent that a block of compute nodes cannot be allocated to the new computing job and that there are enough free compute nodes for the new computing job:
         suspending one or more of the plurality of computing jobs being executed on the parallel computing system, wherein each computing job is being executed on a block of compute nodes provided by the parallel computing system,
         moving each of the one or more suspended computing jobs to another block of compute nodes of the parallel system, whereby a space of available compute nodes provided by the parallel computing system is defragmented, and
         resuming execution of the one or more suspended jobs on the parallel computing system.

18. The system of claim 17, wherein the new computing job includes a request for a specific number of compute nodes of the parallel system on which to execute the new computing job.

19. The system of claim 17, wherein the new computing job includes a request that the new computing job be executed on a specific block of compute nodes provided by the parallel computing system.

20. The system of claim 17, wherein at least one of the plurality of computing jobs requires access to a resource provided by the block on which that computing job is being executed, and wherein the at least one computing job is not one of the one or more suspended and moved computing jobs.

21. The system of claim 17, wherein the compute nodes of the parallel system are connected by a plurality of point-to-point links.

22. A method for deploying computing infrastructure, comprising integrating computer readable code into a computing system, wherein the code in combination with the computing system is adapted to perform the method of claim 1.

\* \* \* \* \*